United States Patent [19]
Obright

[11] Patent Number: 5,752,202
[45] Date of Patent: May 12, 1998

[54] METHOD OF MESSAGE DELIVERY ADAPTED FOR A POWER CONSERVATION SYSTEM

[75] Inventor: Michael H. Obright, Duvall, Wash.

[73] Assignee: Motorola, Inc., Schaumburg, Ill.

[21] Appl. No.: 790,810

[22] Filed: Jan. 30, 1997

Related U.S. Application Data

[63] Continuation of Ser. No. 476,408, Jun. 7, 1995, abandoned.

[51] Int. Cl.$^6$ .............................. H04B 1/38; H04M 1/00
[52] U.S. Cl. .......................... 455/574; 455/38.3; 455/343
[58] Field of Search .................................. 455/38.3, 343, 455/54.1, 54.2, 67.1, 517, 550, 574; 370/311

[56] References Cited

U.S. PATENT DOCUMENTS

| | | | |
|---|---|---|---|
| 4,531,237 | 7/1985 | Bar-on et al. | 455/343 |
| 4,839,639 | 6/1989 | Sato et al. | 455/343 |
| 5,031,231 | 7/1991 | Miyazaki | 455/343 |
| 5,043,721 | 8/1991 | May | 340/825.44 |
| 5,241,542 | 8/1993 | Natarajan et al. | 455/343 |
| 5,361,397 | 11/1994 | Wright | 455/343 |
| 5,392,287 | 2/1995 | Tiedemann, Jr. et al. | 455/343 |
| 5,483,672 | 1/1996 | Sasuta | 455/54.1 |
| 5,535,207 | 7/1996 | Dupont | 455/54.1 |

Primary Examiner—Nguyen Vo
Attorney, Agent, or Firm—J. Ray Wood

[57] ABSTRACT

A method of message delivery used in a data communications system adapted for power conservation, the data communication system having an infrastructure (101), and a subscriber device (120), the method practiced at the subscriber device (120) and including the steps of: waking from a sleep mode at a prearranged time; responding to the infrastructure (101) when a first message is received at the prearranged time; and remaining awake for a predetermined time period to receive from the infrastructure (101) a data message.

11 Claims, 3 Drawing Sheets

METHOD OF MESSAGE DELIVERY ADAPTED FOR A POWER CONSERVATION SYSTEM

This is a continuation of application Ser. No. 08/476,408, filed Jun. 7, 1995 and now abandoned.

FIELD OF THE INVENTION

The instant disclosure deals with power conservation techniques and more particularly but not limited to methods of message delivery adapted for a power conservation system.

BACKGROUND OF THE INVENTION

The need for power conservation is known. All else equal including an upper bound on energy density for battery technology, there is a direct tradeoff between portable product package weight and the length of time the product may be used without recharging or replacing an associated battery. Removing the equality qualifier, practitioners continually struggle with tradeoffs and compromises between product utility, product processing speed, memory, or capability, product size, product weight, useful battery life, and battery technology with it's attendant limitations. Almost all agree that compromise is the operative word, no really satisfactory answer has yet been found, and additional power conservation approaches are needed.

A particularly appropriate case in point is battery powered subscriber devices and more specifically their associated data modems. Wireless data communications systems, protocols, network or infrastructure equipment, and modems together with their host terminals have evolved to provide communications service to a growing user base on both outbound and inbound channels. This data communications service is highly dependent on the specific user and that users needs but may be characterized as sporadic and highly interactive with varying message lengths, content, and protocols. As a result of these characteristics equipment suppliers necessarily have emphasized processing speed, accuracy, and user interaction often at the expense of power consumption. More recently the data communications marketplace has begun and is expected to continue to demand portable subscriber devices and thus data modems that are the functional equivalent of a portable computer combined with a portable two way radio. This market requirement has focused attention on product size and weight and thus battery life and power conservation techniques.

Similarly, message latency, the amount of time it takes a subscriber device to receive a message, is a critical feature of a communication system employing a power saving protocol. Oftentimes there is a design tradeoff between power saving capability and message latency. If the power save protocol is such that the subscriber device is asleep for long periods of time, it takes a long period of time before the subscriber device, i.e. the user, receives unsolicited messages. Likewise, if unsolicited messages are desired in a real-time environment, then the device can not go to sleep for longer periods of time to conserve power.

Clearly an urgent need exists for inventive approaches to conserving power and thus extending the battery life of portable communications equipment while at the same time reducing unsolicited message latency.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Generally the present invention deals with methods of message delivery in a data communications system, such as wireless packet data, adapted for power conservation. The subscriber device, which is generally in a sleep mode, will awake at a prearranged time and look for a short first message from the infrastructure indicating that the infrastructure has pending unsolicited messages to deliver to the subscriber device. If the short first message, referred to hereinafter as a ping message, does not arrive, the subscriber device may go back to the sleep mode to conserve power.

When the subscriber device does receive a ping message, it must respond to the infrastructure, preferably with an acknowledgment message (ACK), and remain awake for a predetermined interval, the awake time period, to receive the undelivered, unsolicited messages from the infrastructure. The ping message provides a mechanism to reduce message latency, while still allowing the subscriber devices to remain in a sleep mode for a large portion of the operating time. The subscriber device, i.e. the user, may schedule the prearranged times to receive ping messages, which hereinafter will be referred to as ping segments. This enables the user to advantageously select between operating features of power conservation and message latency.

Given a data communications system adapted for power conservation including an infrastructure and a subscriber device, the subscriber device may employ a method of message delivery that includes the steps of: waking from a sleep mode at a prearranged time for a first predetermined time period, i.e. ping segment; responding to the infrastructure when a first message, the ping message, is received during the first predetermined time period; and remaining awake for a second predetermined time period, or awake time period, to receive from said infrastructure a second, or data, message.

Furthermore, in a data communications system adapted for power conservation, the system having an infrastructure, a subscriber device, and a communications channel, the communications channel being temporally organized into a sequential plurality of frames, each of the plurality of frames temporally organized into a sequential plurality of windows, the subscriber device having its own root window in each of the plurality of frames, the infrastructure may employ a method for message delivery comprising the steps of:

receiving a ping segment schedule from the subscriber device; sending a first message to the subscriber device at a first time period according to the ping segment schedule; and delivering to the subscriber device within a predetermined second time period a second message when a third message is received from the subscriber device.

Figure 1:
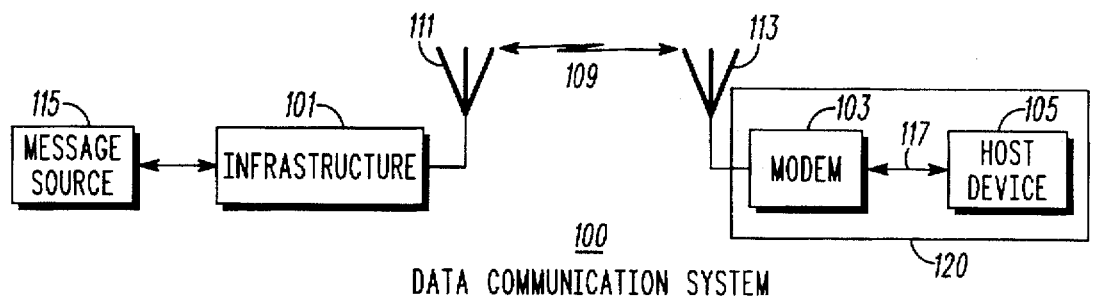
FIG. 1 is a block diagram of a data communications system suitable for employing an embodiment in accordance with the instant invention.

The instant invention can be more fully described with reference to the figures in which FIG. 1 depicts a data communications system (100). The data communications system (100), such as a wireless packet data system, includes a message source (115), such as the public switched telephone network or a data network, shown coupled to an infrastructure (101). The infrastructure (101) includes a transceiver or base station coupled to an antenna (111) and operating to receive and transmit radio signals over a communications channel (109). The radio signals are transmitted from or received by an antenna (113) that is coupled to a modem (103). The modem (103) operates to convert radio signals into data messages and vice a versa in addition to establishing and maintaining the radio communications link with the infrastructure (101). The data messages are supplied to or received from a host device (105), referred to here alternatively as the host, host device, or host terminal, at input/output (117). The combination of the host device (105), modem (103), and antenna (113) comprise the subscriber device (120). Subscriber devices (120) include, but are not limited to, portable computers, personal digital assistants, and general-purpose data processors—all, preferably, with wireless modem capability. It should be noted that while FIG. 1 depicts only one radio channel, one modem, and one infrastructure antenna, a practical system may include a plurality of each. Generally the data communications system (100) is intended to supply specific messages to/from specific host devices in a largely transparent (to end users) fashion.

Figure 2:
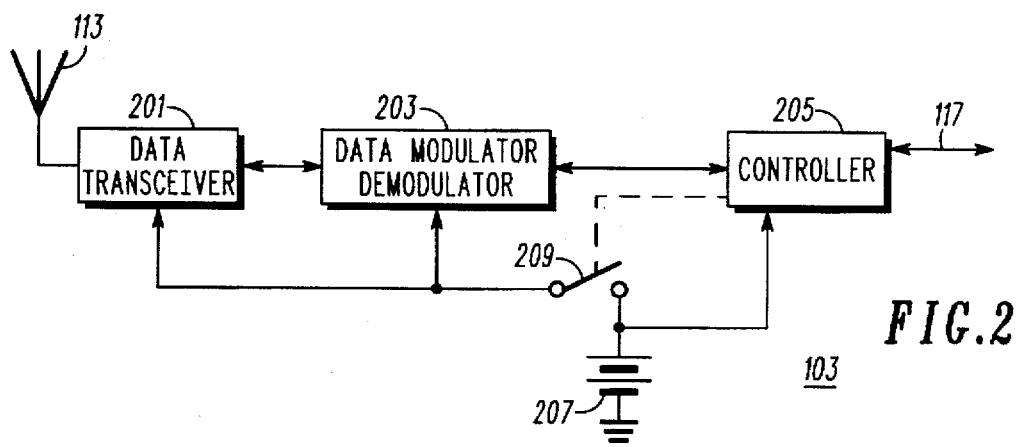
FIG. 2 is a block diagram of a subscriber device adaptable for operation in the FIG. 1 system.

The modem may be more fully described with reference to FIG. 2 in which like reference numerals refer to like elements from FIG. 1. The antenna (113) is coupled to a data transceiver (201). The transceiver (201) includes a receiver and a transmitter and associated functions (not specifically shown) all as well known and operates to convert radio signals at the antenna (113) to a data wave form that is coupled to a data modulator/demodulator (203) or alternatively to convert a data wave form, supplied by the data modulator/demodulator (203), to a radio signal for transmission over the radio channel (109).

The data modulator/demodulator (203) operates to convert the analog data wave form, as provided by the data transceiver (201) to a digital form or binary symbol representation, or alternatively to convert digital data to a an analog wave form suitable for further transmission by the data transceiver (201). The digital form of the data produced by the data modulator/demodulator (203) is provided to the controller (205) as a data message. Digital data that is converted by the data modulator/demodulator (203) to an analog wave form is supplied from the controller (205).

The controller (205) provides various control functions for the other elements of the modem (103) and manages the interface between the modem (103) and the host device (105) at input/output (117). Such control functions include data routing and power conservation control, among others. The controller (205) receives data messages from and provides or delivers data messages to the host (105) via the input/output (117). Switch (209) operates to apply or remove power source (207) from data transceiver (201) and data modulator/demodulator (203). The controller (205) turns off power to data transceiver (201) and data modulator/ demodulator (203) when subscriber device (120) enters a power conservation state, or sleep mode.

The modem device (103), including component parts as described above and as shown in FIG. 2, are more fully described in and may be more fully appreciated by reference to the Motorola Service Manual titled InfoTAC Technical Manual and designated 68P02939C95. The data transceiver described in this manual is well known. A digital signal processor (MCM56001) is used for the data modulator/ demodulator function. A Motorola HC11 controller (M68HC11A1) provides the controller (205) function. The balance of the product includes generally a liquid crystal display used for various indicators, a 128K random access memory is used for the buffer, a rechargeable battery pack is the power source, a self contained antenna is used, and RS-232C serial lines are provided to connect the host (105) to the modem (103) Finally various power switching circuitry all as well known in the art is provided to selectively enable component power control or enter the power conservation state.

Figure 3:
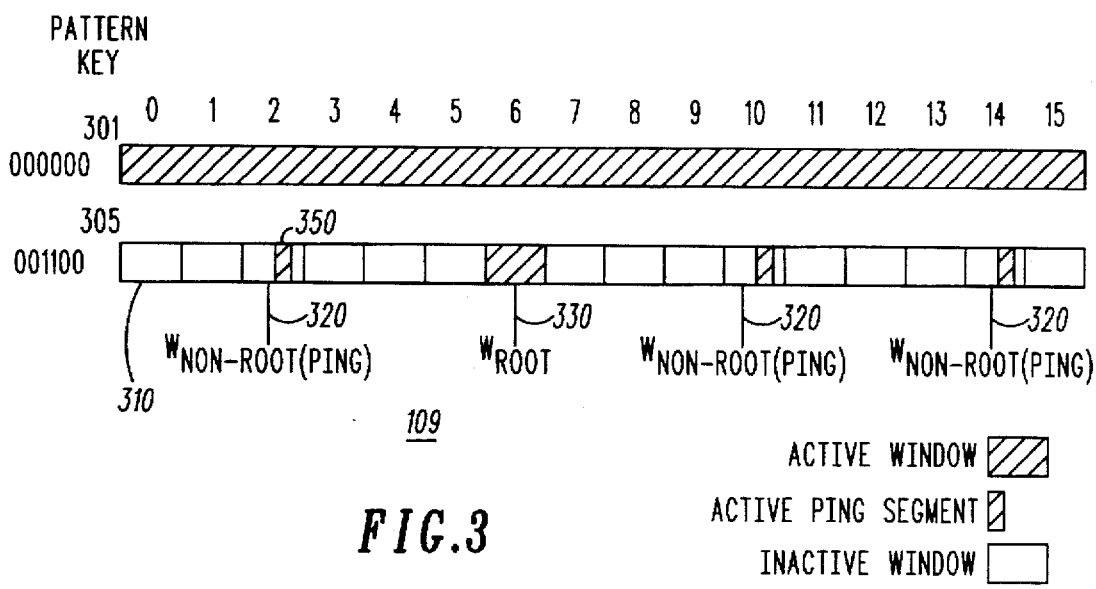
FIG. 3 is a frame diagram showing a windows and ping segments.

The communications channel (109) may be more clearly understood by referring to FIG. 3. The communications channel (109) is temporally organized into a series of frames (305). Each frame (305) is comprised of a plurality of windows (310). A subscriber device (120) not employing a sleep mode mechanism will be awake for all windows (312) during each frame (305). This is shown in FIG. 3 by all windows (312) in frame (305) being shaded and therefore active. Unsolicited messages for subscriber device (120) may be delivered at any time. The message latency in this mode is minimal. However, no power savings is implemented, so the battery life of the subscriber device (120) will be adversely impacted.

Referring now to frame (305) having a sequence of windows, such as window (310), a frame diagram reflecting a preferred embodiment of the present invention is shown. A root window (330) is designated in each frame including frame (305), wherein the subscriber device (120) must become active to receive any undelivered messages from the infrastructure (101). In addition, connectivity management, such as that performed in a Single-Frequency Re-Use (SFR) data communication system, also occurs in the root window (330). In addition to the "active" root window (330), each frame (305) has inactive windows such as window (340) where the subscriber device (120) is in a sleep mode to conserve power.

The frame (305) also contains a plurality of "non-root" windows, such as window (320), each of which have a ping segment (350). The ping segment (350) is a prearranged time period wherein the subscriber device (120) must wake up from a sleep mode and listen for a ping message from the infrastructure (101) indicating that undelivered messages for the subscriber device (120) are pending. The non-root windows (320) having ping segments (350) are scheduled by the subscriber device (120) during device registration with the infrastructure (101). The more non-root windows (320) scheduled, the lower the message latency and the higher the power consumption of the subscriber device (120). However, since the actual active/awake period of a ping segment (350) is less than the actual active/awake period of an entire non-root window (320), significant battery savings is still achieved relative to the root window (330) scenario.

In a preferred embodiment of the instant invention, such as a wireless packet data communication network, the number of windows (310) in a frame (305) and the window size may be different on each channel (109). The infrastructure (101) broadcasts these parameters to all subscriber devices (120) at least once per window frame. The subscriber device (120) is required to remain awake until all of the window configuration parameters of the channel (109) have been established.

Preferably, a frame (305) has thirty-two windows (310) and window sizes ranging from 0.5 seconds to 10 seconds. These parameters would result in a range of window frame periods from 16 seconds to 320 seconds. In a preferred embodiment of the present invention, the ping segment (350) will be positioned approximately in the center of the non-root window (320) and have a duration of 1 to 3 seconds.

The frame (305) for each subscriber device (120) will, statistically, have a different pattern of non-root windows (320), inactive windows (340), and its own root window (330) assigned according to an algorithm suitable to control access contention, such as a hashing algorithm in a preferred embodiment. The root window (330) for some subscriber devices (120) are non-root windows (320) for other subscriber devices (120) and inactive windows (340) for still other subscriber devices (120).

Figure 4:
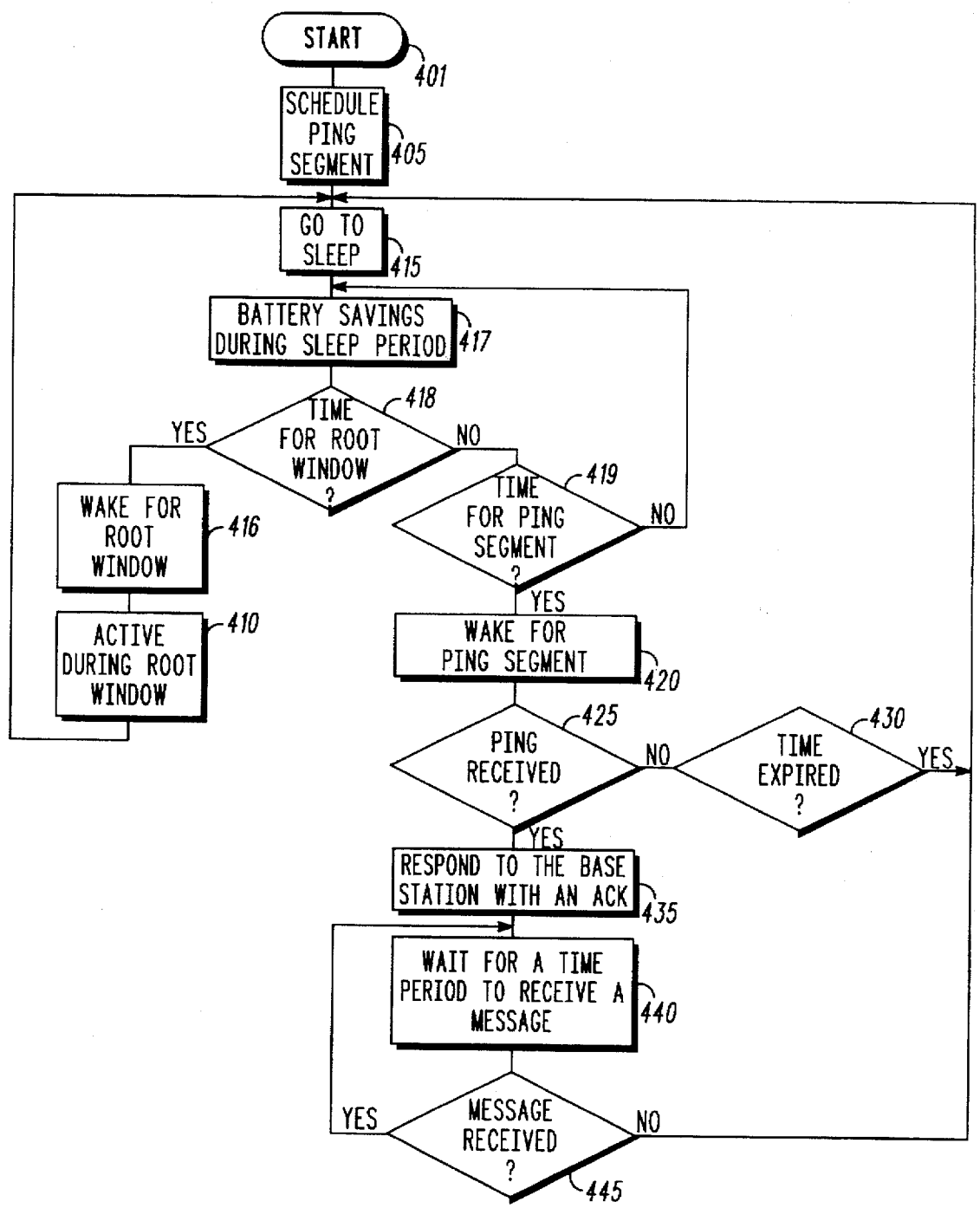
FIG. 4 is a flow chart of a preferred method of message delivery, practiced at a subscriber device, embodiment in accordance with the instant invention.

With the above as a setting, a detailed description of a preferred method embodiment of the instant invention will be provided with reference to FIG. 4. The instant invention contemplates a data communications system (100) having an infrastructure (101) and a subscriber device (120) remotely located. The subscriber device (120) is registered with the infrastructure with each adapted to exchange data communications. Being registered refers to a condition whereby the infrastructure (101) and the subscriber device (120) are cognizant of the fact that each other exists and that a potential wireless communications link between the two may be established if either desires to deliver a message to the other. Registration may include such well known functions as channel acquisition, channel quality measurement, and synchronization, among others.

The subscriber device (120) employs a method of message delivery, starting at step (401), that includes at step (405) scheduling a ping segment. In a preferred embodiment of the instant invention, ping segment scheduling (405) generally happens during the device registration period, once a channel has been acquired. Ping segment scheduling (405) is not per se limited to the device registration period and can occur, for example, at the beginning of a frame.

In a preferred embodiment of the present invention, ping segments are scheduled by the subscriber device by passing a pattern key to the infrastructure (101) indicating for which of the non-root windows (320) of each frame (305) the subscriber device will awake from the sleep mode in order to check for unsolicited messages. The infrastructure (101) may use the ping segments (350) contained in these windows (310) in the frame (305) for ping message delivery.

When the subscriber device (120) has completed device registration, which in a preferred embodiment of the instant invention includes scheduling a ping segment at step (405), the subscriber device (120) enters a sleep mode at step (415). The subscriber device (120) will remain in this state for the purpose of battery savings, step (417), until it is time for the subscriber device's root window, at step (418).

When it is time for the subscriber device's root window (330), the subscriber device wakes-up, at step (416). The subscriber device (120) becomes active during the root window (330) at step (410). During the root window (330), the infrastructure (101) communicates to the subscriber device (120). For example, in a preferred embodiment of the instant invention, the subscriber device may receive data messages from the infrastructure (101). In addition, connection management functions must be performed during the root window (330) in the preferred embodiment, specifically, a Single Frequency Re-Use (SFR) data communications system. Following the active root window (330), the subscriber device (120) returns to step (415) and goes to sleep.

During the battery saving sleep period, step (417), when it is not time for a root window, at step (418), but is time for a ping segment as determined at step (419), the subscriber device (120) is required to wake up at a prearranged time for a predetermined first time period, i.e. the ping segment (350), at step (420). The ping segment (350), was previously scheduled as specified in step (405). At step (425), when a ping message is received during the ping segment (350), the subscriber device (120) responds to the infrastructure (101). In a preferred embodiment of the present invention, the response to the infrastructure (101) is an acknowledgment message (ACK).

The subscriber device (120) must remain awake for a predetermined second time period, hereinafter referred to as an awake time period, to receive a second message. In a preferred embodiment, the second message is a data message and the awake time period ranges from 1 to 31 seconds, but is typically 8 seconds. When the message is received at step (445), the subscriber device waits again for the awake time period for another data message. When no more data messages are received (445), the subscriber device (120) may return to sleep mode at step (415).

Returning to step (425), when no ping message is received from the infrastructure (101) within the predetermined first time period, i.e. the ping segment, at step (430), the subscriber device (120) may return to the sleep mode (415) to conserve power.

Finally, returning to step (418), when it is not time for a root window (330), nor time for a ping segment, step (419), then the subscriber device (120) continues the battery saving sleep period at step (417).

Figure 5:
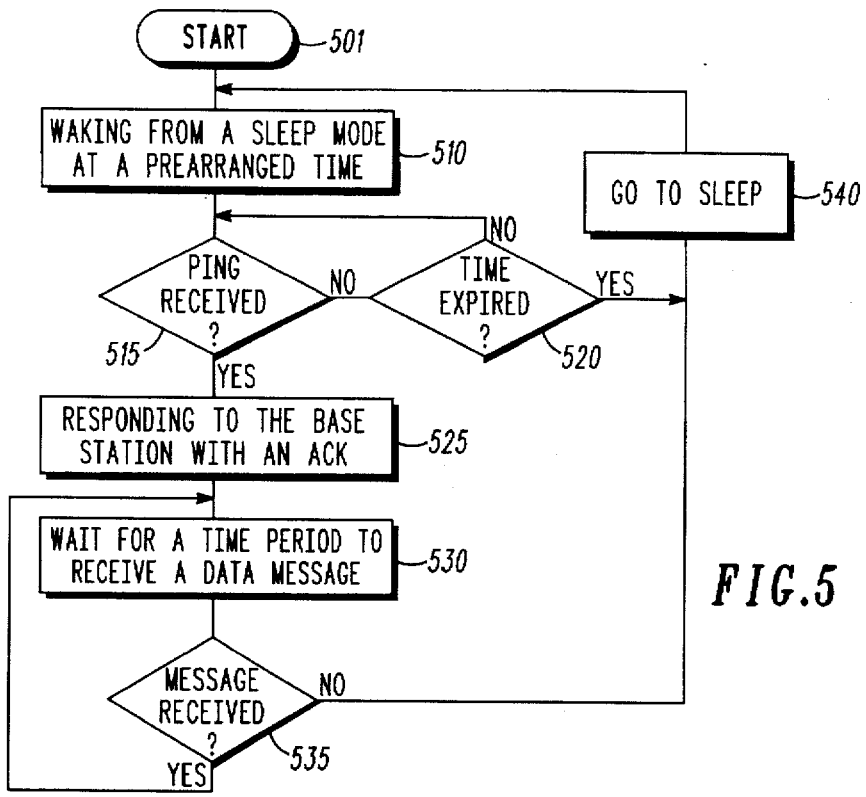
FIG. 5 is a flow chart of an alternative method of message delivery, practiced at a subscriber device, embodiment in accordance with the instant invention.

According to an alternative preferred embodiment of the present invention, with reference now to FIG. 5, a method of message delivery practiced by the subscriber device (120) is shown. The subscriber device has acquired a channel, performed registration functions, and has entered a sleep mode, which steps are not shown, but as is known by practitioners in the art. At step (510) the subscriber device (120) awakes from the sleep mode at a prearranged time. At step (515) a ping message is checked for. If the ping message is not received from the infrastructure (101) during the first predetermined time period, checked at step (520); then the subscriber device (120) may return to sleep mode at step (540) until the next prearranged time according to step (510).

When a ping message is received during the first predetermined time period, at step 515, the subscriber device (120) responds to the infrastructure (101), step (525). In a preferred embodiment of the instant invention, the response to the infrastructure (101) will take the form of an acknowledgment message (ACK), signifying that the ping was received.

The subscriber device (120) remains awake for a second predetermined time period, hereinafter referred to as an awake time period, to receive a second message, preferably a data message at step (530). In a preferred embodiment of the instant invention, the second message is a data message. When the message is received at step 535, the subscriber device waits again for the awake time period for another data message. When no more data messages are received at step (535) within the awake time period, the subscriber device (120) may return to sleep mode at step (540) until the next prearranged time according to step (510).

Figure 6:
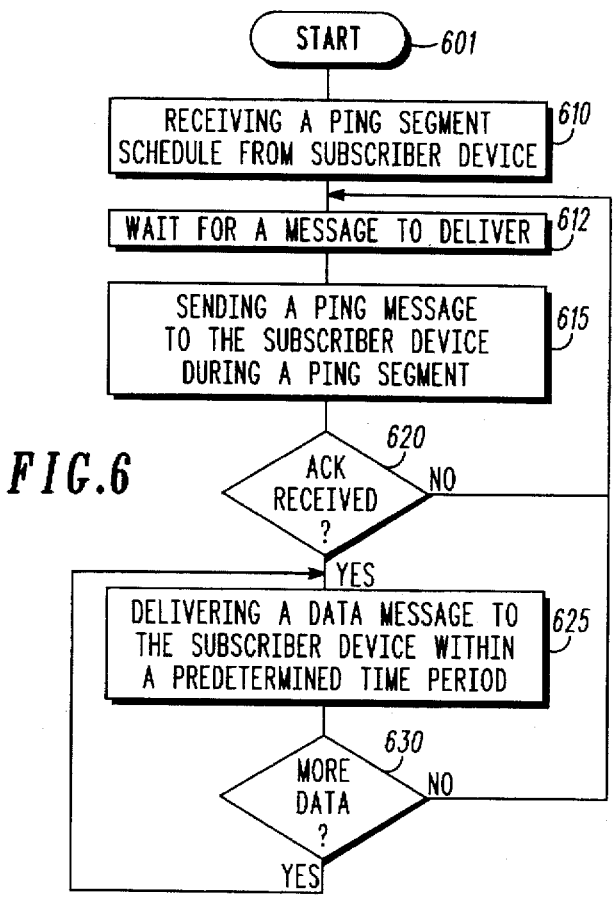
FIG. 6 is a flow chart of a further alternative method of message delivery, practiced at the infrastructure, embodiment in accordance with the instant invention.

Now referring to FIG. 6, a method of message delivery as employed by the infrastructure (101) in accordance with an alternative embodiment will be described. Starting at step (601), a ping segment (330) schedule is received by the infrastructure (101) from the subscriber device (120) at step (610). The infrastructure (101) waits until a data message needs to be delivered to the subscriber device (120), at step (612). When an unsolicited data message arrives for delivery to the subscriber device (120), a ping message is sent during the ping segment (330) at step (615), as previously scheduled.

A second message, preferably a data message, is delivered to the subscriber device (120) within a predetermined time period at step (625), i.e. the awake time period, when a third message, preferably an acknowledgment message, is received from the subscriber device (120) at step (620).

When there are still more data messages to deliver to the subscriber device (120) at step (630), then step (625) is performed again until all undelivered messages have been delivered to subscriber device (120). When there are no more data messages to deliver (630), the infrastructure (101) returns to step (615) to send out the next ping message at the next scheduled ping segment (330).

Returning to step (620), when no acknowledgment message is received from the subscriber device (120), the infrastructure (101) returns to step (615) to send out the next ping message at the next scheduled ping segment (330).

It will be appreciated by those of ordinary skill in the art that the disclosure provides various methods for reducing the latency of message delivery without unduly compromising power conservation in portable wireless communicating devices. These inventive methods may be readily and advantageously employed in a wireless packet data system or other communications system to reduce message latency and still provide power conservation. Hence, the present invention, in furtherance of satisfying a long-felt need of wireless data communications, readily facilitates portable data modems by providing an exemplary method of message delivery that can yield a shorter message latency while providing a useful battery life from a portable battery size.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a radio data communications system adapted for power conservation, said system having an infrastructure and a subscriber device and a communications channel segmented into windows including root windows and non-root windows, a method of message delivery practiced at said subscriber device, said method comprising the steps of:

scheduling a ping segment at a prearranged time in each window wherein said ping segment has a duration equal to a first predetermined time period substantially shorter than a window and is centered in its respective window;

when said window is a non-root window:

waking from a sleep mode at said prearranged time in said non-root window for said first predetermined time period to receive a ping message;

responding to said infrastructure when said ping message is received during said first predetermined time period; and remaining awake for a second predetermined time period in said non-root window following said ping segment to receive from said infrastructure a data message;

when said window is a root window:

waking from a sleep mode at a commencement of said root window; and receiving from said infrastructure any undelivered messages during said root window at least prior to said ping segment.

2. The method of message delivery of claim 1 further comprising the step of performing connectivity management in the root window.

3. The method of claim 1 further comprising, following said step of waking from a sleep mode at said prearranged time, a step of returning to said sleep mode after said ping segment has expired and said subscriber unit has not received a ping message containing an identification which matches a predetermined identification of said subscriber unit.

4. In a radio data communications system adapted for power conservation, said system having an infrastructure, a subscriber device, and a communications channel, said communications channel temporally organized into a sequential plurality of root and non-root windows, a method of message delivery practiced at said subscriber device, said method comprising the steps of:

performing a registration procedure, with said infrastructure, including scheduling ping segment positioned in a center of a window, to deliver a ping message during said ping segment;

becoming active during a root window for its entirety;

receiving any undelivered messages during said root window;

entering a sleep mode during a non-root window;

waking from said sleep mode in said non-root window at a prearrange time;

looking for said ping message individually addressed to said subscriber unit from said infrastructure when in said non-root window;

if said ping message does not arrive, returning to the sleep mode;

if the ping message does arrive, sending an acknowledgment to said infrastructure; and remaining awake in the non-root window for a second time period to receive from said infrastructure a second message.

5. The method of message delivery according to claim 4, further comprising the step of performing connectivity management in the root window.

6. In a radio data communications system adapted for power conservation, said system having an infrastructure, a subscriber device, and a communications channel, said communications channel temporally organized into a sequential plurality of frames, each of said sequential plurality of frames temporally organized into a sequential plurality of windows, said subscriber device having a root window in each of said sequential plurality of frames, a method for message delivery practiced at said subscriber device, said method comprising the steps of:

scheduling a ping segment substantially at a center of a non-root window;

becoming active during said root window in its entirety and receiving any undelivered messages from the infrastructure during said root window;

entering a sleep mode and remaining asleep during a first portion of a non-root window;

waking up during said ping segment of said non-root window;

responding to said infrastructure when a first message is received during said ping segment, else returning to said sleep mode; and remaining awake for a predetermined time period, following said step of responding, to receive from said infrastructure a second message.

7. The method for message delivery of claim 6 further comprising the step of performing connectivity management in the root window.

8. In a radio data communications system adapted for power conservation, said system having an infrastructure, a subscriber device, and a communications channel, said communications channel temporally organized into frames, each frame comprising a root window and a sequential plurality of non-root windows each non-root window having a ping segment substantially shorter in duration than the non-root window and substantially centered in the non-root window, a method of message delivery practiced at said infrastructure, said method comprising the steps of:

delivering any undelivered messages to a subscriber device at least prior to a ping segment if said subscriber device is in a root window;

sending a first message to said subscriber device during said ping segment if said subscriber device is in a non-root window; and delivering any undelivered messages to said subscriber device, if said subscriber device is in a non-root window, during any remaining time of said non-root window following the ping segment only when an acknowledgment message is received from said subscriber device within a predetermined time period following said first message.

9. The method of message delivery of claim 8 further comprising the step of performing connectivity management in the root window.

10. In a radio data communications system adapted for power conservation, said system having an infrastructure, a subscriber device, and a communications channel, said communications channel temporally organized into a sequential plurality of frames, each of said sequential plurality of frames temporally organized into a sequential plurality of windows, said subscriber device having a root window and a plurality of non-root windows in each of said sequential plurality of frames, a method for message delivery practiced at said infrastructure, said method comprising the steps of:

receiving a ping segment schedule from said subscriber device;

positioning a ping segment substantially in a center of a window;

delivering messages to said subscriber device active in said root window during a first time period;

delivering individual ping messages to said subscriber device active in a non-root window, if any, during a second time period;

delivering messages to said subscriber device active in said non-root window within a third time period after acknowledgment messages are received from said subscriber device active in said non-root window; and delivering messages to said subscriber device active in said root window after the step of delivering messages to said subscriber device active in said non-root window but before the end of the root window.

11. The method for message delivery of claim 10 further comprising the step of performing connectivity management in the root window.

* * * * *